United States Patent [19]

Burrough

[11] Patent Number: 4,800,668

[45] Date of Patent: Jan. 31, 1989

[54] ADJUSTABLE TENSION FISHING ROD

[75] Inventor: Peter Burrough, Kwe Kwe, Zimbabwe

[73] Assignee: CMN Associates, Inc., Carpinteria, Calif.

[21] Appl. No.: 146,036

[22] Filed: Jan. 20, 1988

[51] Int. Cl.⁴ .............................................. A01K 87/00
[52] U.S. Cl. ..................................................... 43/18.1
[58] Field of Search .................................. 43/18.1, 18.5

[56] References Cited

U.S. PATENT DOCUMENTS

| 2,196,743 | 4/1940 | Cowdery et al. | 43/18.1 |
|---|---|---|---|
| 2,351,734 | 6/1944 | Backe | 43/18 |
| 2,478,131 | 8/1949 | Rossi | 43/18 |
| 2,816,389 | 12/1957 | Sens | 43/18 |
| 3,415,002 | 12/1968 | Schaefer | 43/18 |
| 3,500,570 | 3/1970 | Hubbard | 43/18 |
| 3,570,164 | 3/1971 | Tozier | 43/18 |
| 4,024,666 | 5/1977 | Carver | 43/18 |
| 4,582,758 | 4/1986 | Bruce et al. | 43/18.1 |

FOREIGN PATENT DOCUMENTS 1172665  12/1969  United Kingdom ................ 43/18.1

Primary Examiner—M. Jordan
Attorney, Agent, or Firm—Laff, Whitesel, Conte & Saret

[57] ABSTRACT

The invention is directed to an adjustable stiffness fishing rod and a device for varying the pressure within the rod. The fishing rod includes a hollow rod filled with a liquid and a device for pressurizing the liquid to vary the stiffness of the rod. The device includes a piston which moves within the interior of the rod to vary the pressure in the liquid and a rotatable drive mechanism to move the piston. The device may be integrally contained in the rod. Alternatively, the device may be in the form of a stand-alone unit which may be inserted into the rod.

7 Claims, 1 Drawing Sheet

ADJUSTABLE TENSION FISHING ROD

FIELD OF THE INVENTION

The invention generally relates to fishing rods in which the degree of stiffness or flexibility of the rod can be varied by the user and, more particularly, to hollow fishing rods filled with fluid whereby the pressure of the fluid is adjusted to achieve the desired degree of stiffness or flexibility.

BACKGROUND OF THE INVENTION

Conventional fishing rods cannot adapt to different fishing conditions by permitting adjustment of the stiffness or flexibility of the rod to accommodate such varied conditions. Thus, there is a need for fishing rods in which the stiffness or flexibility of the rod can be adjusted to adapt to varied fishing conditions.

Hollow fishing rods in which the degree of stiffness or flexibility of the rod may be adjusted by adjusting the air pressure within the rod are known in the art. In this respect, U.S. Pat. No. 3,500,570 to Hubbard shows a hollow fishing rod provided with a single-action air pump in the handle to increase or decrease the air pressure inside the rod and thus vary the stiffness or flexibility of the rod.

Hubbard suffers from the disadvantage, however, that the type of air pump used in the device tends to be inefficient because it requires quite a bit of effort to achieve a desired stiffness of the rod. Air pump devices such as those used in the Hubbard fishing rod also tend to be bulky in size and weight, thereby making them awkward to use. Moreover, Hubbard's reliance on air pressure makes the rod susceptible to an unexpected reduction in stiffness due to leakage.

A need therefore exists for a fishing rod in which the stiffness or flexibility of the rod can be more efficiently and easily varied.

SUMMARY OF THE INVENTION

The adjustable stiffness fishing rod of the invention includes a hollow rod filled with a liquid. The rod incorporates a device within the handle portion to pressurize or depressurize the fluid in the rod to adjust the stiffness of the rod.

The device for pressurizing the liquid in the rod includes a piston which is moved within the interior of the rod by a rotatable drive mechanism. Moving the piston in the rod pressurizes the liquid to increase the stiffness of the rod. A ring seal is provided about a portion of the lateral surfaces of the piston to insure efficient pressurization of the liquid by providing a fluid tight fit with the interior surfaces of the rod.

The device for pressurizing the liquid may be integrally built into the handle portion of the rod. Alternatively, the device may be provided as a stand-alone unit which may be inserted into the handle portion.

The pressurization device is operated by a rotatable drive mechanism which includes a knob that is connected to a threaded bolt. The bolt contacts the end of the piston that is remote from the liquid. Turning the knob moves the piston within the rod to pressurize the liquid so as to provide a desired degree of rod stiffness. The rotatable drive mechanism also includes a gauge member for enabling the user to correlate the extent of movement of the knob and the associated stiffness of the rod.

DETAILED DESCRIPTION OF THE INVENTION

Figure 1:
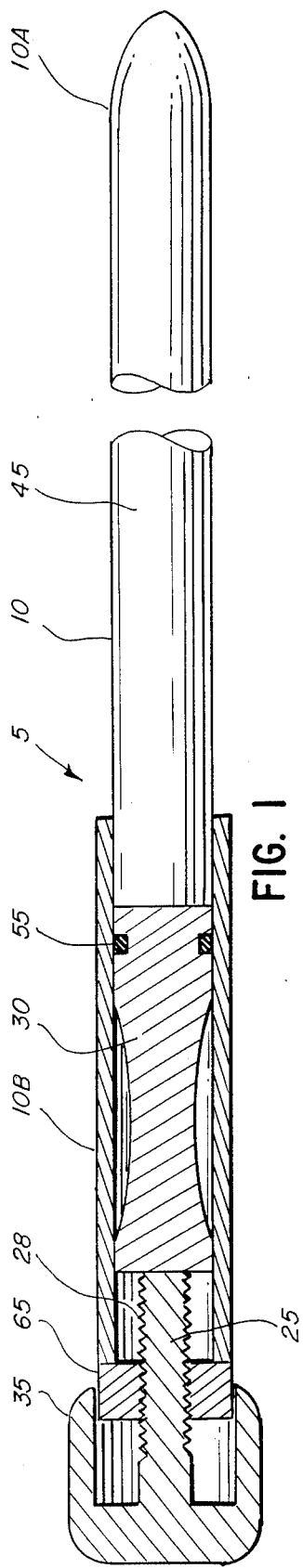
FIG. 1 is a cross-sectional view of the adjustable fishing rod that incorporates a pressurization device for adjusting the stiffness of the rod.

The adjustable fishing rod and pressurization device of the invention, and their manner of function, will now be explained in detail by reference to the drawings wherein like numerals refer to like components. FIG. 1 shows an adjustable stiffness fishing rod which incorporates a pressurization device for increasing or decreasing the stiffness of the rod. As shown in FIG. 1, the adjustable rod, generally shown at 5, includes a hollow rod 10 filled with liquid 45 retained between closed portion 10A and handle portion 10B. Liquids suitable for use in rod 10 preferably have a low freezing point and should be non-reactive with the materials of rod 10. Rod 10 utilizes materials which are capable of withstanding pressure exerted by liquid 45 without fracture.

Figure 2:
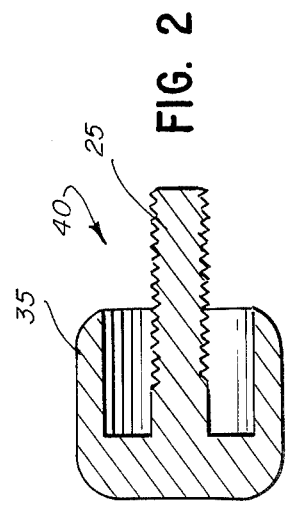
FIG. 2 is a cross-sectional view of the rotatable drive mechanism for control of the pressurization device.

The pressurization device for increasing or decreasing the stiffness of rod 10 includes piston 30 which incorporates a sealing ring member 55 to insure a fluid-tight fit with the interior surfaces of rod 10 and a rotatable drive mechanism 40 for controlling the operation of the device. As shown in detail in FIG. 2, drive mechanism 40 includes a rotatable knob 35 having integrally attached bolt member 25. Bolt member 25 is free to turn within guage 65 by means of screw threads 28. Rotating knob 35 causes inward or outward movement of bolt 25 to move piston 30 within handle portion 10B.

As can be seen from FIG. 1, the stiffness of rod 10 is increased by rotating knob 35 with attached bolt member 25 to cause piston 30 to move toward end 10A. In so doing, the hydrostatic pressure of liquid 45 is increased with a concommittant increase in stiffness of rod 10. Similarly, rotating knob 35 in the direction opposite to that employed to increase the hydrostatic pressure of liquid 45 causes the stiffness of rod 10 to decrease.

The user, by employing rotatable drive mechanism 40, can adjust the stiffness of the rod to meet varied fishing conditions by rotating knob 35. Rotating knob 35 causes piston 30 to produce an immediate change in the hydrostatic pressure of liquid 45 with an accompanying change i the stiffness of rod 10. The user of rod 10 is therefore able to adjust efficiently the rod to a desired stiffness with a minimal degree of effort.

Figure 3:
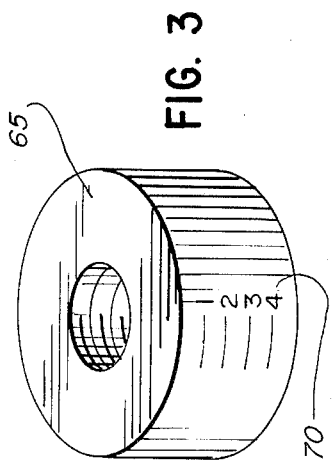
FIG. 3 is a perspective view of the gauge member for use with the rotatable drive mechanism.

A desired rod stiffness can be readily duplicated by use of gauge member 65. As shown in detail in FIG. 3, gauge member 65 has markings 70 on its external, vertical surface. The user, by correlating the position of knob 35 on gauge member 65 with the desired degree of rod stiffness, can readily duplicate the desired stiffness in rod 10 when using the rod at some future time.

Figure 4:
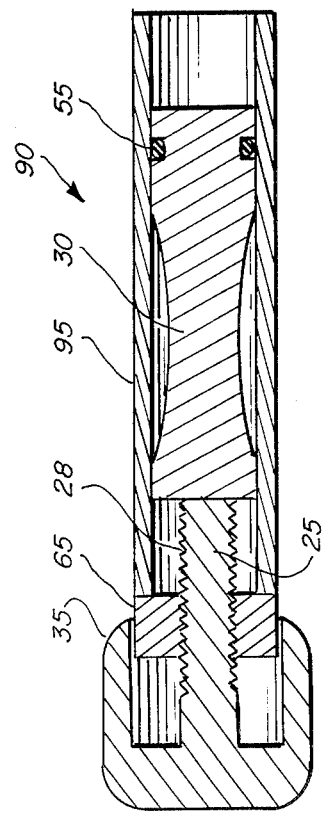
FIG. 4 is a cross-sectional view of the stand alone pressurization device which may be inserted into the rod.

In an alternative embodiment, adjustable stiffness rod 10 may employ a stand-alone pressurization device 90 that may be inserted into handle portion 10B. As shown in FIG. 4, stand-alone pressurization device 90 includes outer cylinder 95 having piston 30 therein. A sealing ring 55 is provided on the lateral surfaces of piston 30 to insure a fluid tight fit with the interior surfaces of cylinder 95. The position of piston 30 within cylinder 95 is controlled by knob 35 and threaded bolt 25.

In use, pressurization device 90 is inserted into handle portion 10B of rod 10. Device 90 is secured in position in handle portion 10B by a clamp, not shown. The user then turns knob 35 to move piston 30 within cylinder 95 to compres liquid 45 to thereby achieve a desired degree of stiffness in rod 10.

The foregoing invention has been described with particular reference to adjustable fishing rods. However, the invention is not limited as to these specific types of hollow, liquid filled devices. As such, various structural changes may be made to the inventive fishing rod and pressurization device without departing from the scope of the invention.

I claim:

1. A fishing rod comprising a hollow rod member having one closed end and one open end, a liquid disposed in said hollow rod member, means for adjusting the pressure of said liquid in said rod disposed in said open end of said rod, said means being controlled by a rotatable drive mechanism.

2. The fishing rod of claim 1 wherein said means for adjusting pressure includes a piston which exerts pressure on said liquid in said hollow rod member by moving towards said closed end of said rod.

3. The fishing rod of claim 2 wherein said piston includes a sealing means for providing a fluid tight fit between the piston and the interior surfaces of said rod.

4. The fishing rod of claim 1 wherein said rotatable drive mechanism comprises a threaded bolt and a means for turning said bolt, said means dispersed on one end of the bolt.

5. The fishing rod of claim 4 wherein said means for turning said bolt includes a knob attached to said bolt.

6. The fishing rod of claim 5 wherein said rotatable drive mechanism further comprises a gauge means for correlating the extent of movement of said knob with the degree of the pressure of said liquid in said hollow rod member.

7. The fishing rod of claims 5 or 6 wherein said means for turning said bolt can be manually actuated.

* * * * *